United States Patent
Ovadia et al.

(10) Patent No.: US 6,327,709 B1
(45) Date of Patent: Dec. 4, 2001

(54) METHOD AND APPARATUS FOR FILTERING INTERFERENCE AND NONLINEAR DISTORTIONS

(75) Inventors: Shlomo Ovadia, Yardley; Qin Zhang, Bensalem; Mark Kolber, Churchville, all of PA (US)

(73) Assignee: General Instruments Corporation, Horsham, PA (US)

(*) Notice: Subject to any disclaimer, the term of this patent is extended or adjusted under 35 U.S.C. 154(b) by 0 days.

(21) Appl. No.: 09/219,140

(22) Filed: Dec. 22, 1998

(51) Int. Cl.[7] .................. H04N 7/10; H04N 7/14
(52) U.S. Cl. .............. 725/124; 725/121; 725/125; 348/608; 348/21; 348/192; 375/346; 375/350
(58) Field of Search .................. 725/121, 124, 725/125, 129; 348/470, 608, 607, 21, 192, 193, 723, 724; 375/346, 350; 455/295, 296; 359/180, 187; H04N 7/10, 7/14

(56) References Cited

U.S. PATENT DOCUMENTS

| | | | |
|---|---|---|---|
| 5,162,900 | * | 11/1992 | Citta ....................... 348/607 |
| 5,481,389 | * | 1/1996 | Pidgeon et al. ............ 359/161 |
| 5,699,179 | * | 12/1997 | Gopalakrishnan ........... 359/183 |
| 5,850,305 | * | 12/1998 | Pidgeon .................... 359/187 |
| 5,870,513 | * | 2/1999 | Williams ................... 455/5.1 |
| 5,881,363 | * | 3/1999 | Ghosh et al. ............... 455/5.1 |
| 5,915,205 | * | 6/1999 | Chen ....................... 455/5.1 |
| 5,937,330 | * | 8/1999 | Vince et al. ............... 455/5.1 |
| 6,032,019 | * | 2/2000 | Chen et al. ................ 455/5.1 |
| 6,049,693 | * | 4/2000 | Baran et al. ............... 455/3.1 |
| 6,094,211 | * | 7/2000 | Baran et al. ............... 348/6 |
| 6,151,145 | * | 11/2000 | Srivastava et al. .......... 359/133 |

OTHER PUBLICATIONS

Forney, G. David, Jr. et al., "The V.34 High–Speed Modem Standard," *IEEE Communications Magazine*, Dec. 1996, pp. 28–33.

Eyuboglu, M. Vedat et al., "Advanced Modulation Techniques for V.Fast," *European Transactions on Telecommunications* (ETT), vol. 4, No. 3, May–Jun. 1993, pp. 243–256.

Wozencraft John M. et al., *Principles of Communication Engineering*, John Wiley & Sons, New York, 1965, Section 4.4 "Receiver Implementation," pp. 233–245.

Scarpa, Carl, "A Recursive NTSC Canceler to Reduce Co–Channel Interference into HDTV Broadcasts," *IEEE transactions on Consumer Electronics*, vol. 39, No. 3, Aug. 1993, pp. 696–703.

* cited by examiner

*Primary Examiner*—Michael Lee
*Assistant Examiner*—Jean W. Désir
(74) *Attorney, Agent, or Firm*—Barry R. Lipsitz

(57) ABSTRACT

Interference and/or nonlinear distortions are reduced in a signal communicated from a transmitter to a receiver. To reduce interference, the transmitter is momentarily disrupted, during which time the receiver analyzes interference on the communication path to determine the frequency of at least one peak thereof. Information is communicated from the receiver to the transmitter identifying the frequencies of the interference peaks. Based on this information, the transmitter pre-distorts the signal to accentuate the signal magnitude at the identified frequencies. The pre-distorted signal is then communicated to the receiver, where it is filtered to attenuate the signal magnitude at the identified frequencies. An adaptive scheme periodically determines the interference peak frequencies. For nonlinear distortion cancellation (e.g., CSO/CTB), there is no need to disrupt the transmitter since the frequencies of the distortion are already known. Pre-distortion at the transmitter and filtering at the receiver are performed at the known, fixed frequencies.

15 Claims, 8 Drawing Sheets

METHOD AND APPARATUS FOR FILTERING INTERFERENCE AND NONLINEAR DISTORTIONS

BACKGROUND OF THE INVENTION

The present invention relates to electronic communications systems, and more particularly to a method and apparatus for filtering interference and nonlinear distortions in a signal communicated from a transmitter to a receiver via a communication path.

The invention is particularly suited for use in connection with a television distribution system, such as a hybrid fiber/coax (HFC) network, in which a subscriber terminal such as a set-top box or cable modem receives television and/or data signals from the distribution system "headend" via a "downstream" communication path and sends information back to the headend on an "upstream" return path. In such an environment, the interference filtered by the present invention is often referred to as "ingress" or "ingress noise" and the nonlinear distortions of concern comprise composite second order (CSO) and composite triple beat (CTB) distortions.

Hybrid fiber/coax networks, which are based on branch and tree architecture, provide a cost-effective means for delivering downstream broadband services such as analog/digital video and high-speed data. In addition, they provide subscribers with high-speed data upstream transmission, for example, in the 5–42 MHz portion of the RF spectrum. Cumulative ingress noise is the main impairment in the return-path portion of HFC networks. The types of ingress noise, which appear on the return-path, can be classified as follows:

A. Narrowband short-wave signals, originating from radio stations and other sources, coupled to the return-path cable plant at the subscriber location or in the distribution plant.

B. Common mode distortion originating from non-linearities in the cable plant.

C. Location specific interference generated by an electrical device at the subscriber location. See, e.g., C. A. Eldering, N. Himayat, and F. M. Gardner, "CATV Return Path Characterization for Reliable Communications", *IEEE Communications* 8, 62–68 (1995). The amount of cumulative ingress noise in the return-path network is essentially the limiting factor in determining the maximum number of simultaneous users and the maximum data transmission rate that can be achieved.

Video signals sent to set-top boxes are also often subject to "burst/impulse noise" originating from peak Composite Second Order (CSO) and/or Composite Triple Beat (CTB) distortions. These distortions are generally present at known frequencies, which depend upon the television frequency plan used for the analog video signals. In cable television systems, such frequency plans include the integrally-related-carrier (IRC) plan and the harmonically-related-carrier (HRC) plan. CSO and CTB distortions can lead to video blocking and visually degraded areas in a television picture. One method for addressing the CSO/CTB distortion problem in multi-channel AM-VSB (amplitude modulated vestigial sideband)/QAM (quadrature amplitude modulation) video transmission systems and the like is disclosed in co-pending, commonly assigned U.S. patent application Ser. No. 09/170,852 filed Oct. 13, 1998 and entitled "Method and System for Enhancing Digital Video Transmission To A Set-Top Box." In the system disclosed in that patent application, the performance of hybrid analog and digital video transmission systems is improved by determining the relative magnitude and frequency locations of nonlinear distortions, identifying the analog channel frequency plan, and then selecting a digital channel map based thereon.

It would be advantageous to have a robust and cost-effective method and apparatus for filtering interference (such as ingress noise or other interference types) and nonlinear distortions in a signal communicated from a transmitter to a receiver via a communication path, such as a return path signal from a set-top box or the like. It would be further advantageous to provide such a method and apparatus that operate adaptively, so that interference (e.g., ingress) is efficiently filtered even when the frequency of the interference peaks changes over time. Such a method and apparatus should enable a plurality of interference peaks to be filtered, and should automatically adapt to changing conditions in the interference.

It would be still further advantageous to provide a method and apparatus for filtering nonlinear distortion in a signal communicated from a transmitter to a receiver via a communication path. Such a method and apparatus would be particularly useful in the downstream channel of an HFC cable television distribution system, where either an IRC or HRC frequency plan is used.

The present invention provides methods and apparatus enjoying the aforementioned and other advantages.

SUMMARY OF THE INVENTION

In accordance with the present invention, a method and apparatus are provided for filtering interference in a signal communicated from a transmitter to a receiver via a communication path. The transmitter is momentarily disrupted from transmitting over the communication path, e.g., by placing it in an idle state. During the momentary disruption, the receiver analyzes interference on the communication path to determine the frequency of at least one noise peak of the interference. Information is communicated from the receiver to the transmitter identifying the frequency of the at least one interference noise peak. Based on this information, the transmitter pre-distorts the signal to accentuate the signal magnitude at the identified frequency or frequencies of the interference peak(s). The pre-distorted signal is then transmitted by the transmitter to the receiver, which filters the pre-distorted signal to attenuate the signal magnitude at the identified frequency or frequencies.

In an illustrated embodiment, the receiver performs a real or complex signal frequency analysis on the interference to determine the frequency peak(s) thereof. The filtering at the receiver can use, for example, a transfer function that is the inverse of the transfer function used to pre-distort the signal at the transmitter. In one possible implementation, the filtering at the receiver uses the Z-transform transfer function:

$$H(z) = \frac{1 + 2\mathrm{Re}(\alpha)z^{-1} + z^{-2}}{1 - 2\mathrm{Re}(\alpha)R \cdot z^{-1} + R^2 \cdot z^{-2}}$$

where $\alpha = \exp(2j\pi\phi)$, $\phi$ is the normalized center frequency of the filter, and R is a constant. The pre-distortion at the transmitter can implement the inverse transfer function $H(z)^{-1}$.

A power threshold detection can be used during the analysis to identify the frequency location(s) of the interference peak(s). For example, only peaks exceeding a pre-defined power threshold level might be identified for pre-distortion at the transmitter and subsequent filtering at the receiver.

In an adaptive method, the transmitter is periodically disrupted from transmitting over the communication path. Interference on the communication path is analyzed at the receiver during the periodic disruptions, and information is communicated from the receiver to the transmitter identifying changes in the interference peak(s) determined during the periodic disruptions. The transmitter then pre-distorts the signal to accentuate the signal magnitude in accordance with the changes of the interference peaks.

Also disclosed are a method and apparatus for filtering nonlinear distortion in a signal communicated from a transmitter to a receiver via a communication path. The signal is pre-distorted at the transmitter to accentuate the signal magnitude at a fixed frequency where the nonlinear distortion takes place. The pre-distorted signal is transmitted to the receiver, which provides filtering to attenuate the signal magnitude at said fixed frequency.

If the signal is, for example, an integrally-related carrier (IRC) television channel signal having composite second order (CSO) and composite triple beat (CTB) distortions present at different fixed frequencies, the CSO and CTB distortions are filtered by pre-distorting the signal at the transmitter to accentuate the signal magnitude at a first fixed frequency where the CSO distortion resides, and at a second fixed frequency where the CTB distortion resides. The pre-distorted signal is then filtered at the receiver at the first and second fixed frequencies.

If the signal is, for example, a harmonically related carrier (HRC) television channel signal having composite second order (CSO) and composite triple beat (CTB) distortions present at a common fixed frequency, the CSO and CTB distortions are filtered by pre-distorting the signal at the transmitter to accentuate the signal magnitude at the common fixed frequency. The pre-distorted signal is then filtered at the receiver at the common fixed frequency.

DETAILED DESCRIPTION OF THE INVENTION

The present invention provides techniques for filtering both interference and nonlinear distortions in a communication system. For example, the invention is useful to filter ingress noise which may include, for example, narrowband interference, common mode distortion and location specific interference in an upstream channel (e.g., return path) of a cable television system. The invention may also be used to filter nonlinear distortions such as CSO and CTB distortions, which may, for example, be present in the downstream path of a cable television system. Additional uses of the invention for other interference and distortion types will be apparent to those skilled in the art.

Figure 1:
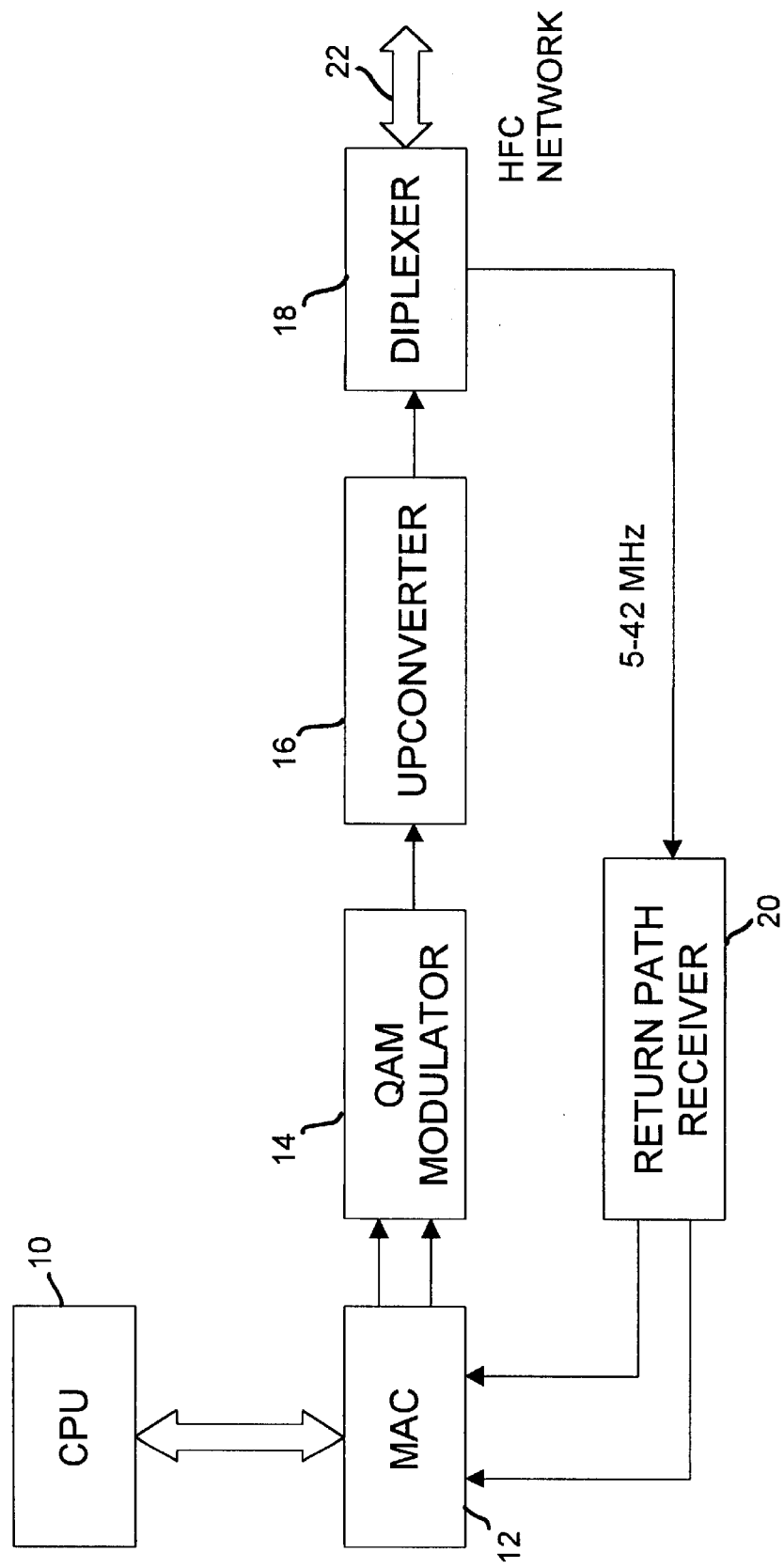
FIG. 1 is a block diagram of illustrating a cable television headend or cable modem termination system (CMTS) with a return path receiver.

FIG. 1 illustrates, in simplified block diagram form, a cable modem termination system (CMTS) at a cable television headend. The CMTS is controlled by a computer processor (CPU) 10 which communicates with the other CMTS components over a bi-directional bus coupled to a media access controller (MAC) 12. The MAC 12 controls the physical layer of the communication signals and coordinates various aspects of the data carried by the signals such as the time data is sent, the time data is received, etc. The MAC 12 also receives signals from a return path receiver 20 which, in turn, receives signals from a remote subscriber terminal (e.g., a cable modem or set-top box). The data signals to be transmitted are provided by the MAC to a QAM modulator 14 for modulation in a conventional manner. An upconverter 16 converts the output of the QAM modulator to a suitable radio frequency (RF) for transmission over, e.g., a bi-directional HFC network 22. The CMTS is coupled to the HFC network via a diplexer 18 in a conventional manner.

Figure 2:
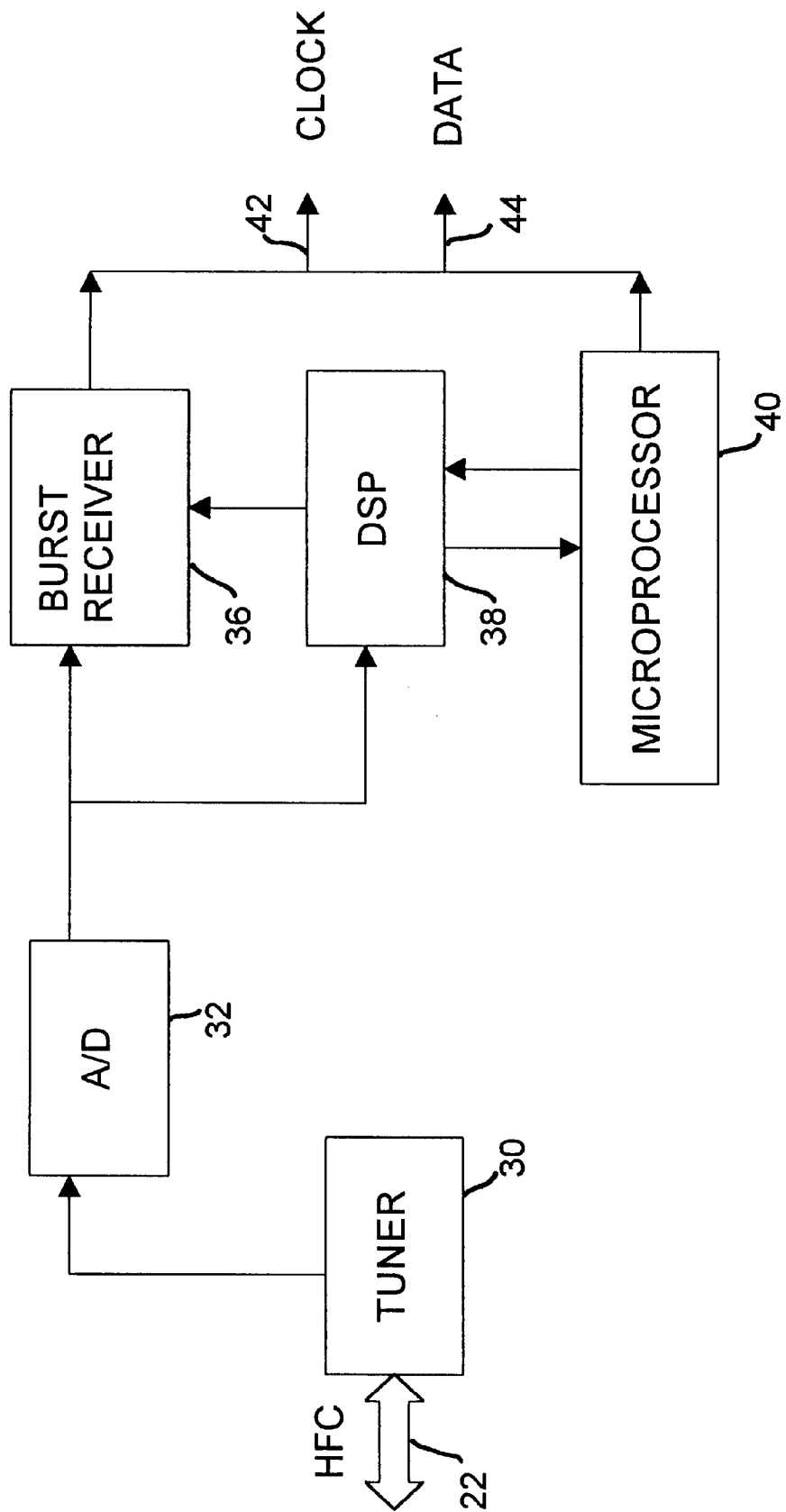
FIG. 2 is a more detailed block diagram of the return path receiver component of FIG. 1.

The front-end of the return-path receiver 20 converts a bursty analog signal received from the subscriber terminal to a sampled digital signal, which can be fed to an off-line (i.e., non-real time) Digital Signal Processing (DSP) chip 38 in the receiver, as illustrated in FIG. 2. In order to filter interference (e.g., narrowband interference such as ingress), the interference must first be detected. To do this, an initialization process is commenced wherein the digital transmitter (e.g., QPSK or QAM) in the cable modem (CM) or at the set-top box is placed in an idle mode, so that only the cumulative interference will be received by the return path receiver 20 at the CMTS. The off-line DSP 38 provided within the return path receiver 20 analyzes the received noise. This analysis can be performed using a complex signal frequency analyzer which uses, for example, a Discrete Fourier Transform (DFT) algorithm. The spectral power density of the interference is significantly higher than that of the white Gaussian noise (WGN), and the noise peaks can easily be identified using a threshold power detector. The threshold level can be set, for example, to be 10-dB higher than the WGN floor to assure that only large interference peaks are being identified. To achieve, for example, 10-kHz interference peak resolution in a 3.2-MHz data channel (worst-case), 640 sampling points are required for the DFT.

Once the frequencies of the interference peaks have been determined, information identifying these specific frequencies is transmitted to the subscriber terminal via the downstream QAM modulator 14, upconverter 16 and diplexer 18 as shown in FIG. 1. It is noted that although a QAM modulator is shown for purposes of illustration, any suitable form of digital modulation can be used to transmit the interference peak identification information to the subscriber terminal. As an alternative, an alternate channel (which can be analog or digital) could be used to pass this information to the subscriber terminal.

Relevant portions of one possible implementation of the return path receiver 20 are illustrated in block diagram form in FIG. 2. It is noted that the illustrated portions are provided as an example only, and that other implementations will be apparent to those skilled in the art. In a cable television implementation, the receiver portions illustrated can be provided in a CMTS or other headend embodiment.

The HFC network 22 is coupled to a tuner 30 provided in the receiver. A desired upstream signal received from the HFC network, such as a data signal, is tuned using tuner 30 and passed to an analog to digital converter (A/D) 32. The digitized signal from A/D 32 is passed to an appropriate receiver, such as burst receiver 36 and a DSP 38. The DSP performs a real or complex signal frequency analysis of the return path signals to determine the frequency of each of the interference peaks. The DSP sends information indicative of the frequency of each peak (e.g., the filters' coefficient data) to the microprocessor 40 to set up notch filters in the burst receiver 36. This information is also communicated to the subscriber's set-top box or cable modem for use in setting up complementary pre-distortion filters. The purpose of the pre-distortion filters in the subscriber's cable modem or set-top box is to accentuate the transmitted return path (upstream) signal at the frequencies where the interference is expected to occur at the receiver. Corresponding notch filters at the CMTS will then attenuate the same frequencies at the return path receiver, thereby effectively filtering out the effect of the interference. The attenuation at the burst receiver 36 not only filters out the interference; it also returns the signal level to its proper magnitude at the interference peak frequencies.

Figure 3:
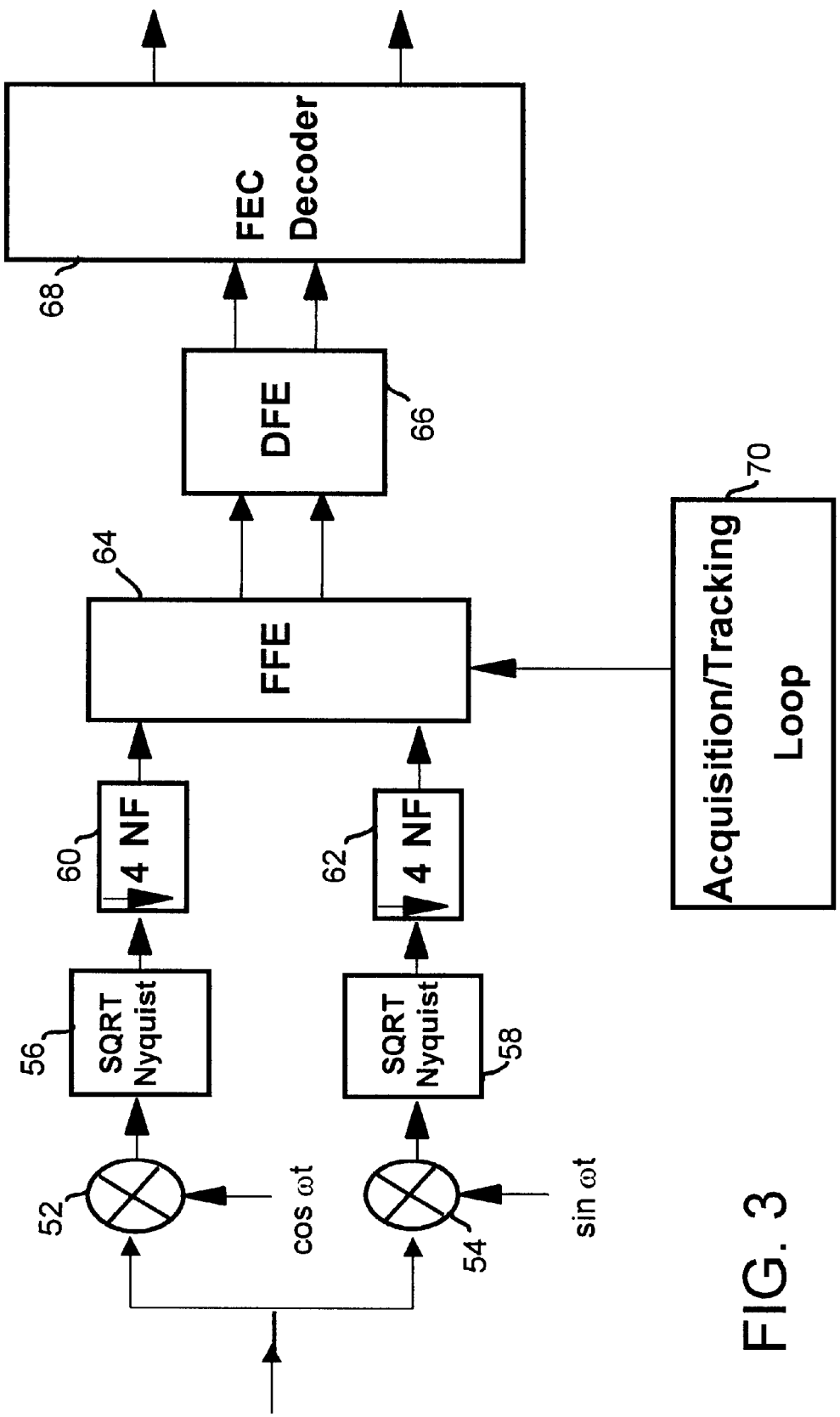
FIG. 3 is a detailed block diagram of one embodiment of a burst receiver that can be used in the receiver of FIG. 2 in accordance with the invention.
Figure 4:
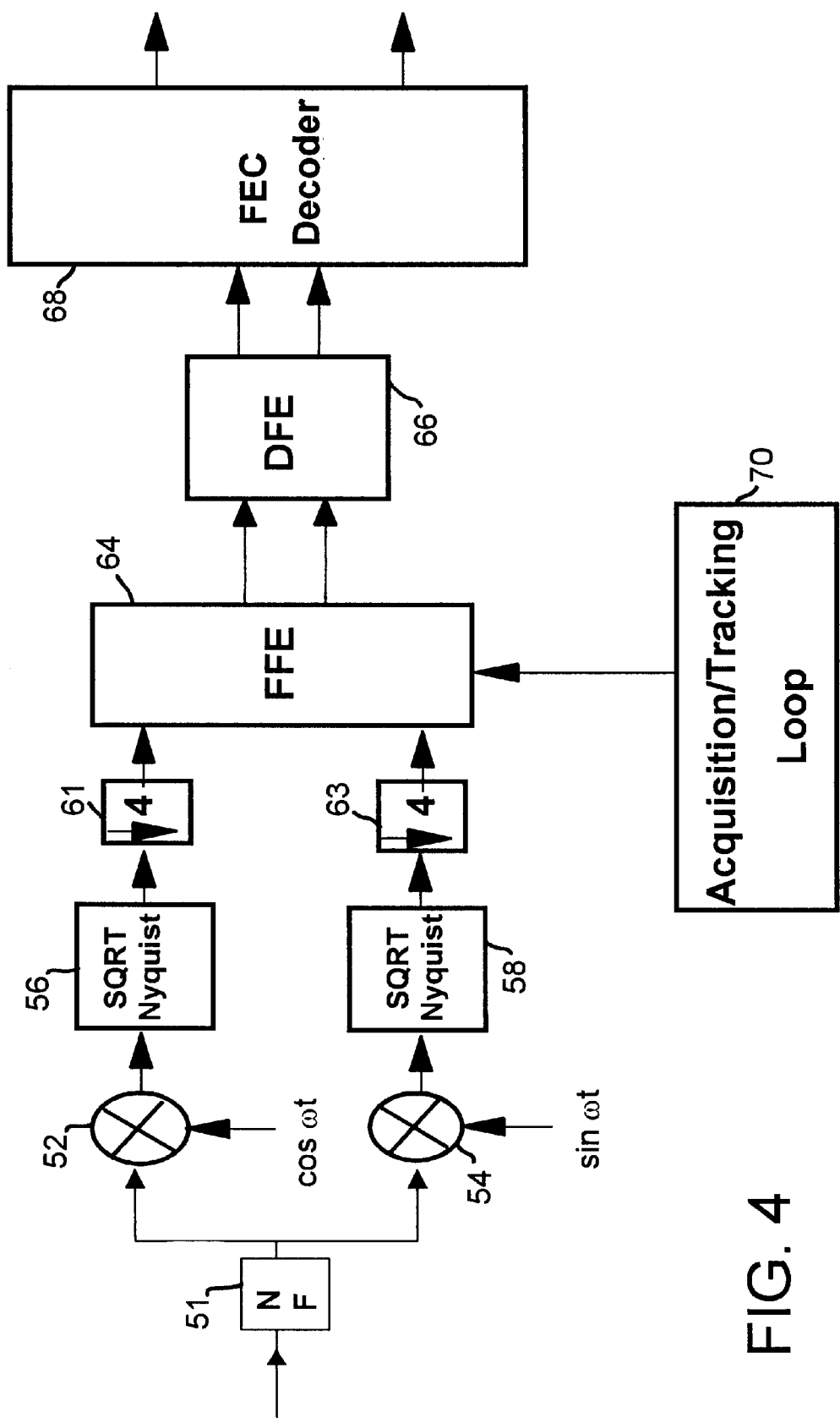
FIG. 4 is a detailed block diagram of an alternate embodiment of a burst receiver that can be used in the receiver of FIG. 2 in accordance with the invention.

FIGS. 3 and 4 illustrate further detail for two different embodiments of a return path receiver using notch filters in accordance with the present invention. The receivers illustrated in these figures can be used to provide the functions of return path receiver 20 shown in FIG. 1. In particular, the intermediate frequency (IF) return path signal from the tuner 30 of FIG. 2 is input to an A/D converter 32 (FIG. 2), which digitizes the signal and passes it to I and Q phase quadrature mixers 52, 54 respectively (FIG. 3 or 4). In the embodiment of FIG. 3, square-root Nyquist filters 56, 58 filter the I and Q signals, and pass them to respective notch filters (NF) combined with ÷4 decimation filters 60, 62, thereby providing down-sampled I and Q signals that have been attenuated back to normal levels at the interference frequency peaks. In the embodiment of FIG. 4, notch filters 51 are provided immediately prior to quadrature mixers 52, 54 instead of being combined with the decimator filters 61, 63.

The filtered and down-sampled I and Q signals are passed to a feed forward equalizer (FFE) 64 and decision feedback equalizer (DFE) 66 for conventional equalization. A forward error correction (FEC) decoder 68 then processes the equalized I and Q signals in a conventional manner. Acquisition and tracking loop 70 enables the receiver to properly acquire and track the received signal, as well known in the art.

The following difference equation describes a second-order digital notch filter design that can be used to implement the invention:

$$y(n) = b_0 \cdot x(n) + b_1 \cdot x(n-1) + b_2 \cdot x(n-2) - a_1 \cdot y(n-1) - a_2 \cdot y(n-2)$$

where:

$x(n)$ and $y(n)$ are the time-discrete input and output sequences, $b_2 = b_0 = 1$, $b_1 = 2\text{Re}(\alpha)$, $a_1 = -2R^2 \cdot \text{Re}(\alpha)$, $a_2 = R^2$, and $\alpha = \exp(2j\pi\phi)$ $\phi$ = the normalized center frequency the notch, and $R$ is a constant related to the notch magnitude. Thus, only two coefficients are needed for this filter.

Figure 5:
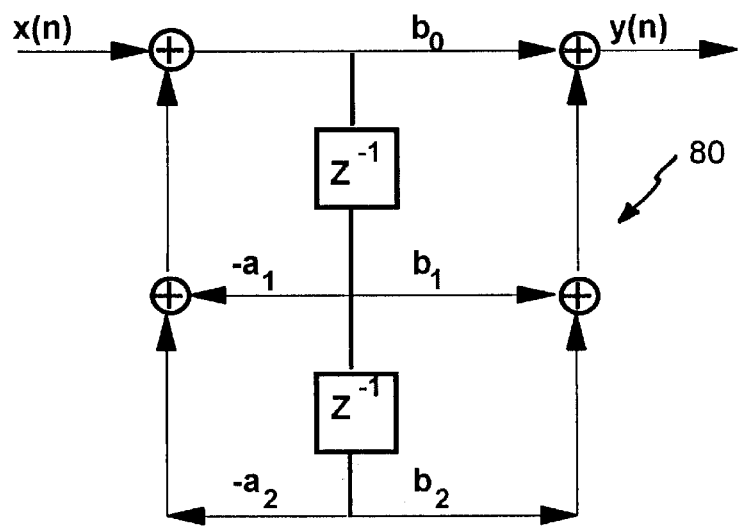
FIG. 5 is a block diagram of an example second-order notch filter structure that can be used in a receiver in accordance with the invention.

The second-order notch filter structure, which is shown in FIG. 5, is known as a direct form II structure. The transfer function or the Z-transform of the notch filter 80 is described by the following equation:

$$H(z) = \frac{1 + 2\text{Re}(\alpha)z^{-1} + \cdot z^{-2}}{1 - 2\text{Re}(\alpha)R \cdot z^{-1} + R^2 \cdot z^{-2}}$$

The pre-distortion filter at the subscriber terminal transmitter has exactly the inverse transfer function as the second-order notch filter shown above [$H(z)^{-1}$]. The pre-distortion filters can, for example, be inserted after the symbol mapper for a QPSK (quadrature phase shift keyed) or QAM (quadrature amplitude modulation) implementation, and before a programmable transmitter pre-equalizer that is used to cancel the effects of intersymbol interference (ISI). It is noted that although a notch filter is described herein for use with the return path receiver, other types of filtering may be used instead to provide the same or similar results.

Figure 6:
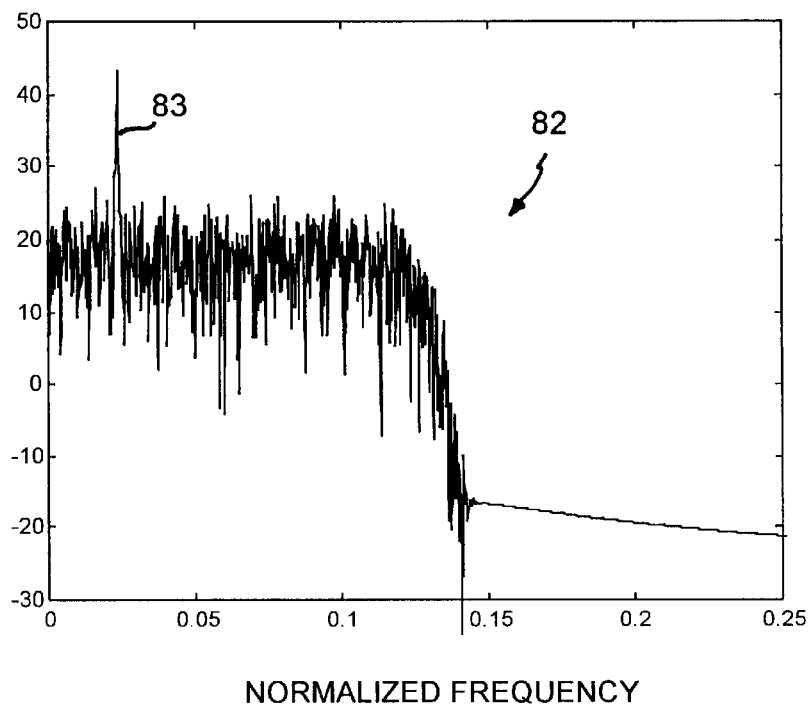
FIG. 6 is a graph illustrating a simulated baseband 256-QAM spectrum with a narrowband interference peak located at 0.5-MHz off the center of the channel with C/(N+I)=0dB.

FIG. 6 illustrates a simulated baseband 256-QAM spectrum 82 with a narrowband interference peak 83 located 0.5-MHz off the center of the channel and with C/(N+I)=0 dB.

Figure 7:
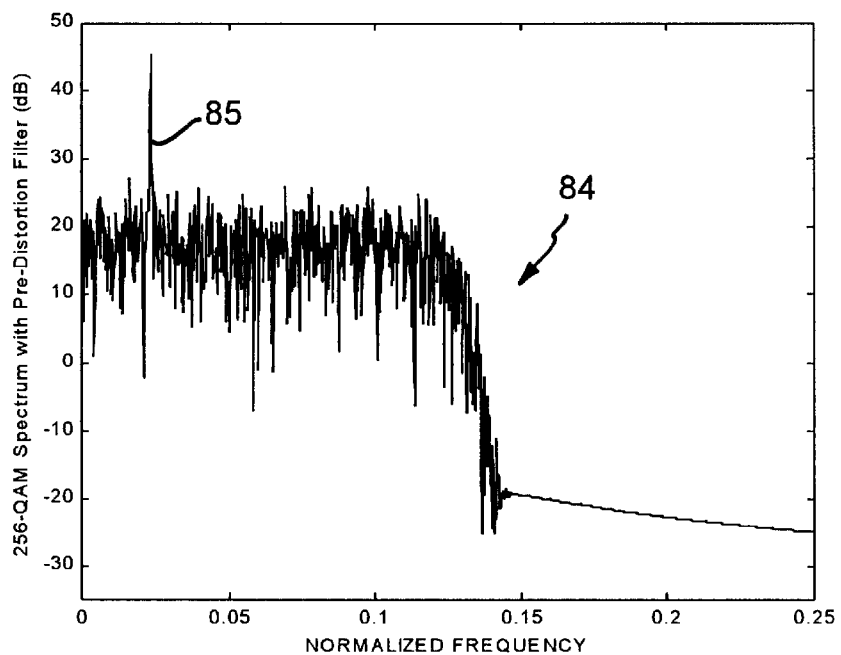
FIG. 7 is a graph illustrating a simulated baseband 256-QAM spectrum of a pre-distorted signal to be transmitted in accordance with the invention.

FIG. 7 illustrates the spectrum 84 of the simulated baseband 256-QAM spectrum with the pre-distortion 85 added at the transmitter.

Figure 8:
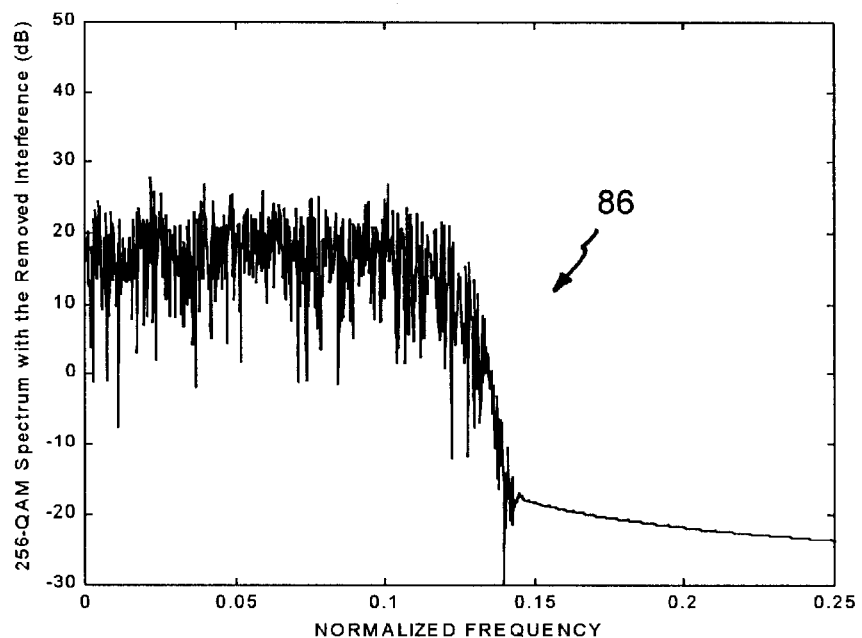
FIG. 8 is a graph illustrating the simulated 256-QAM baseband spectrum of the signal of FIG. 7 after the interference has been removed by filtering at the receiver in accordance with the invention.

FIG. 8 shows the simulated baseband 256-QAM spectrum 86 at the upstream receiver after the narrow interference peak 83 and pre-distortion 85 have been removed.

Figure 9:
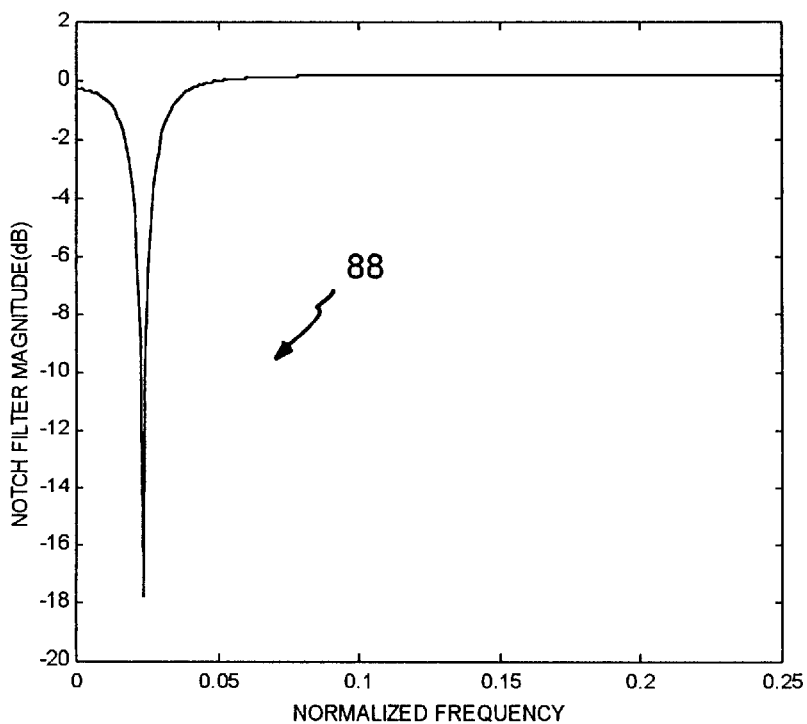
FIG. 9 is a graph illustrating the amplitude response of a notch filter that can be used at the receiver for filtering the pre-distorted signal.
Figure 10:
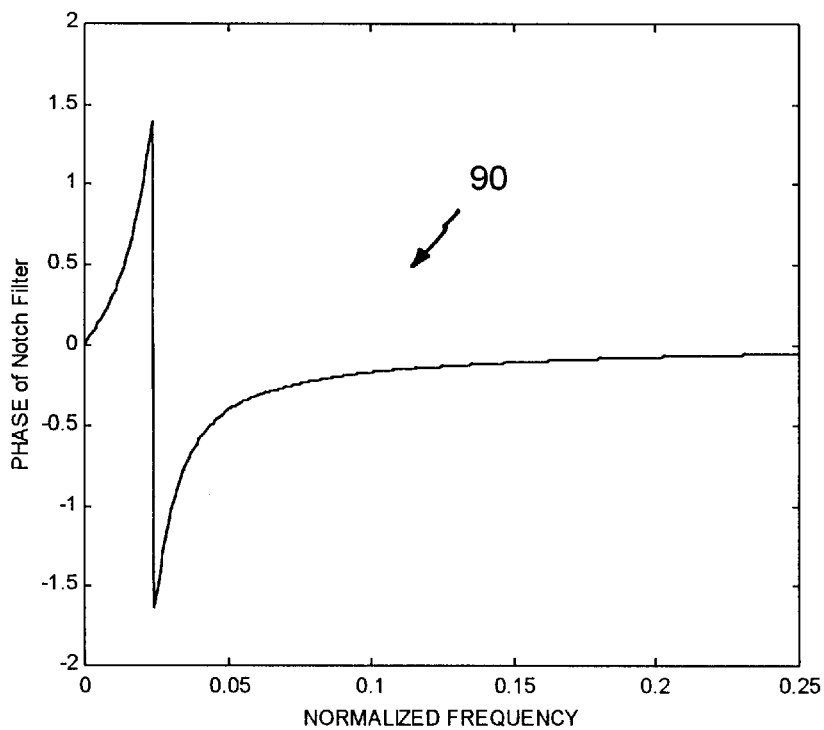
FIG. 10 is a graph illustrating the phase response of a notch filter that can be used at the receiver for filtering the pre-distorted signal.

FIGS. 9 and 10 illustrate the amplitude and phase responses 88, 90 respectively, of the second order notch filter of FIG. 5, as a function of the normalized frequency.

Figure 11:
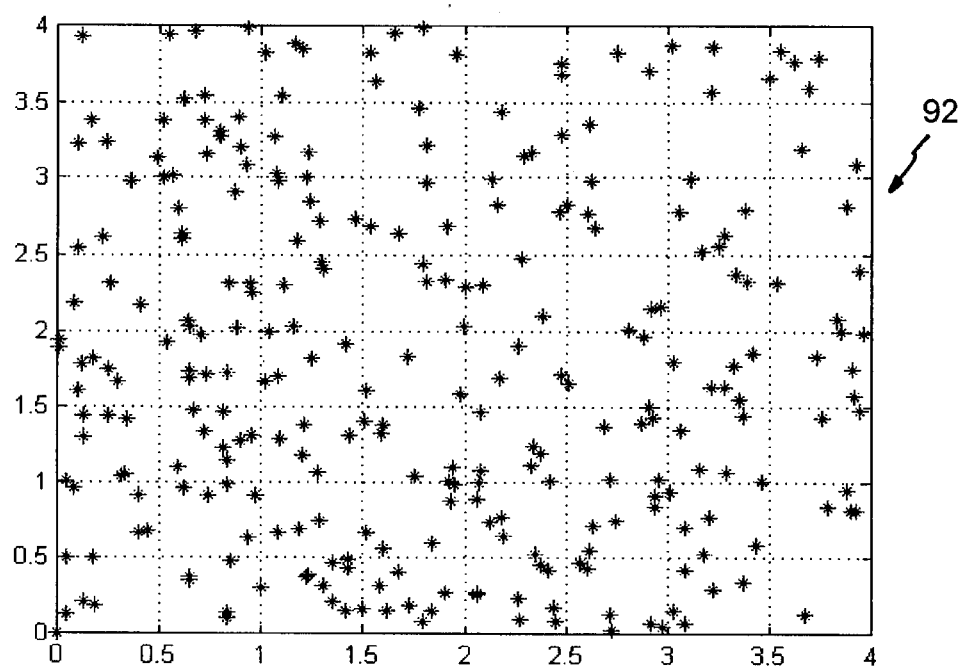
FIG. 11 is an illustration of a simulated quadrant of a 256-QAM I/Q constellation with narrowband interference that has not been filtered in accordance with the invention.

FIG. 11 shows a simulated single quadrant 92 of the 256-QAM constellation when the interference peak illustrated in FIG. 6 is present. It is clear from this figure that the received signal contains many errors.

Figure 12:
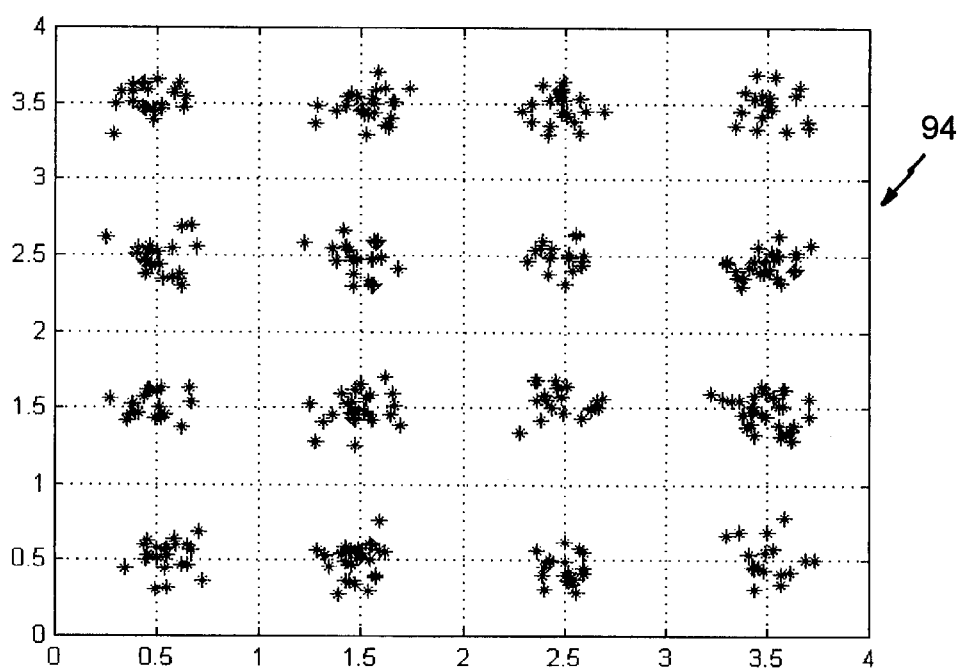
FIG. 12 is an illustration of a simulated quadrant of a 256-QAM I/Q constellation with narrowband interference that has been filtered in accordance with the invention.

FIG. 12 shows a simulated single quadrant 94 of the 256-QAM constellation in the presence of the interference peak, but after the application of the interference filtering technique of the present invention. The simulation results indicate an error-free reception for the demodulated 256-QAM signal.

In order to further refine the present invention, the filtering of interference such as ingress noise can be made adaptive. In particular, between upstream burst intervals, (e.g., once every second) the subscriber terminal transmitter may be idled to "quiet" the return path. This will enable the CMTS to monitor the ingress peaks on the quieted return path. The off-line DSP chip 38 at the return-path receiver in the CMTS can determine if the previously detected ingress peaks are still present or if there are new ingress peaks. The updated information (parameter $\alpha$ in the transfer function for $H(z)$) on the frequency of the current interference peak(s) is then sent to the subscriber terminal (e.g., set-top or cable modem) transmitter via the downstream modulator to enable and/or disable appropriate pre-distortion filters at the return-path transmitter. At the same time, appropriate notch filters at the return path receiver are enabled and inappropriate notch filters are disabled.

A variation of the techniques described above can be applied to downstream signal (e.g., digital video) transmission to subscriber terminals to overcome the effect of nonlinear (CSO/CTB) distortions. The location of CSO and CTB distortions in an HFC network depends on the cable TV frequency plan used for the analog video signals. The two most widely used cable TV frequency plans are the integrally-related-carrier (IRC) and harmonically-related-carrier (HRC) plans. In the IRC plan the first picture carrier frequency is located at 55.2625-MHz with successive picture carriers located six MHz apart up to 1-GHz. In the HRC frequency plan, the picture carrier frequencies are down-shifted 1.25-MHz compared with the corresponding picture carriers in IRC plan. The advantage of the HRC plan is that the CSO and CTB distortion products fall on the picture carrier, and thus their effect becomes almost invisible. In the IRC plan, the CSO distortions are located ±1.25-MHz from the corresponding picture carrier frequency, and thus can become visible.

The following Table 1 shows the various options for the IRC and HRC frequency plans:

TABLE 1

The location of CSO and CTB distortions relative to the QAM channel center frequency.

| Frequency Plan | CSO Distortions | CTB Distortions |
| --- | --- | --- |
| IRC Plan | 0.5-MHZ relative to QAM channel center frequency. | 1.75-MHz relative to QAM channel center frequency. |
| HRC Plan | 1.75-MHz relative to QAM channel center frequency. | 1.75-MHz relative to QAM channel center frequency. |

To overcome the impact of CSO/CTB distortions using the IRC plan at the QAM receiver, two pre-distortion filters (one for CSO and one for CTB) with $H(z)^{-1}$ frequency response are enabled in the QAM modulator, which is located at the cable headend. Two notch filters with $H(z)$ frequency response and with the same coefficients are also enabled in the QAM receiver in the set-top box. No adaptation is required here since the frequencies of the nonlinear distortions are always known in hybrid analog/digital HFC networks. For the HRC plan, only one pre-distortion filter and one corresponding notch filter are required, since CSO and CTB occur at the same frequency.

It should now be appreciated that the present invention provides methods and apparatus for filtering interference and nonlinear distortions in communications systems. Although the invention has been described in connection with cable television systems, wherein the downstream path may suffer from nonlinear distortions (CSO/CTB) and the upstream path may suffer from ingress noise, the invention is not limited to use in such systems or to these types of interference and distortion. The novel techniques for interference detection and reduction and for filtering nonlinear distortion are applicable to any communication system where such interference resides at detectable or already known frequencies. By pre-distorting the transmitted signal and filtering the pre-distorted signal at the receiver, effective reduction or elimination of interference and nonlinear distortion is obtained. Accordingly, various adaptations and modifications may be made to the invention without departing from the scope thereof as set forth in the claims.

What is claimed is:

1. A method for filtering a signal communicated from a transmitter to a receiver via a communication path to reduce interference, comprising the steps of:

momentarily disrupting said transmitter from transmitting over said communication path;

analyzing interference on said communication path at the receiver during the momentary disruption to determine the frequency of at least one interference peak;

communicating information from the receiver to the transmitter identifying the frequency of the at least one interference peak;

pre-distorting said signal at the transmitter to accentuate the signal magnitude at the identified frequency;

communicating the pre-distorted signal to said receiver; and filtering the pre-distorted signal at said receiver to attenuate the signal magnitude at the identified frequency.

2. A method in accordance with claim 1 wherein said analyzing step performs a real or complex signal frequency analysis on the interference to determine the frequency peak(s) thereof.

3. A method in accordance with claim 1 wherein said filtering at the receiver uses a transfer function that is the inverse of the transfer function used to pre-distort the signal at the transmitter.

4. A method in accordance with claim 1 wherein said filtering at the receiver uses the Z-transform transfer function:

$$H(z) = \frac{1 + 2\text{Re}(\alpha)z^{-1} + z^{-2}}{1 - 2\text{Re}(\alpha)R \cdot z^{-1} + R^2 \cdot z^{-2}}$$

where $\alpha = \exp(2j\pi\phi)$, $\phi$ is the normalized center frequency of the filter, and R is a constant.

5. A method in accordance with claim 4 wherein said pre-distortion at the transmitter implements the inverse transfer function $H(z)^{-1}$.

6. A method in accordance with claim 1 wherein: said transmitter is periodically disrupted from transmitting over said communication path;

interference on said communication path is analyzed at the receiver during the periodic disruptions;

information is communicated from the receiver to the transmitter identifying changes in the interference peak(s) determined during the periodic disruptions; and the transmitter pre-distorts the signal to accentuate the signal magnitude in accordance with the changes of the interference peaks.

7. A method in accordance with claim 1 wherein said analysis step identifies the frequency location(s) of the interference peak(s) in accordance with a power threshold level.

8. Apparatus for filtering interference in a signal communicated from a transmitter to a receiver via a communication path, said receiver comprising:

a real or complex signal frequency analyzer adapted to analyze interference on the communication path during momentary disruptions of said signal to determine the frequency of at least one interference peak, and means for communicating information from the receiver to the transmitter identifying the frequency of the at least one interference peak;

said transmitter comprising:
  a filter adapted to pre-distort said signal at the transmitter to accentuate the signal magnitude at the identified frequency; and
said receiver further comprising:
  a filter adapted to attenuate the signal magnitude of the pre-distorted signal at the identified frequency.

9. Apparatus in accordance with claim 8 wherein:
  said communication path comprises a cable television system return path coupling a subscriber location to a cable television system headend,
  said transmitter is provided at the subscriber location;
  said receiver is provided at the cable television system headend; and
  said interference comprises ingress noise.

10. Apparatus in accordance with claim 8 wherein: said transmitter communicates the pre-distorted signal to the receiver using digital modulation.

11. Apparatus in accordance with claim 8 wherein the filter at said receiver comprises a notch filter.

12. Apparatus in accordance with claim 11 wherein said notch filter has a Z-transform transfer function described by:

$$H(z) = \frac{1 + 2\text{Re}(\alpha)z^{-1} + z^{-2}}{1 - 2\text{Re}(\alpha)R \cdot z^{-1} + R^2 \cdot z^{-2}}$$

where $\alpha = \exp(2j\pi\phi)$, $\phi$ is the normalized center frequency of the filter, and R is a constant.

13. Apparatus in accordance with claim 12 wherein the pre-distortion filter at the transmitter implements the inverse transfer function $H(z)^{-1}$.

14. Apparatus in accordance with claim 13 wherein:
  said complex signal frequency analyzer periodically analyzes interference on the communication path during momentary disruptions of said signal to determine changes in the interference peak(s) over time, and
  said notch and pre-distortion filters are programmable to provide said signal attenuation and accentuation, respectively, at the interference peak(s) as the frequency of the peak(s) changes over time.

15. Apparatus in accordance with claim 8 wherein said complex signal frequency analyzer includes a threshold power level detector for use in determining the frequency of said at least one interference peak.

* * * * *